United States Patent
Dyle Kim et al.

(10) Patent No.: US 11,285,857 B2
(45) Date of Patent: Mar. 29, 2022

(54) CUP HOLDER ASSEMBLY

(71) Applicant: GM Global Technology Operations LLC, Detroit, MI (US)

(72) Inventors: Taryn Dyle Kim, Detroit, MI (US); Sam K. Kim, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 16/692,689

(22) Filed: Nov. 22, 2019

(65) Prior Publication Data
US 2021/0155139 A1    May 27, 2021

(51) Int. Cl.
*B60N 3/00* (2006.01)
*B60N 3/10* (2006.01)

(52) U.S. Cl.
CPC .................................... *B60N 3/106* (2013.01)

(58) Field of Classification Search
None
See application file for complete search history.

(56) References Cited

U.S. PATENT DOCUMENTS

| | | | |
|---|---|---|---|
| 9,221,581 B2* | 12/2015 | Yokota | B60N 3/105 |
| 10,279,721 B1* | 5/2019 | Nelson | B65D 81/3881 |
| 11,001,184 B2* | 5/2021 | Kotsuji | B60N 3/105 |
| 2011/0228632 A1* | 9/2011 | Kozlowski | B01F 7/1605 |
| | | | 366/343 |
| 2019/0111824 A1* | 4/2019 | Koarai | F16H 21/44 |

FOREIGN PATENT DOCUMENTS

WO    WO-2016012200 A1 *   1/2016   ............ B60N 3/106

* cited by examiner

*Primary Examiner* — Steven M Marsh
(74) *Attorney, Agent, or Firm* — Vivacqua Crane PLLC

(57) ABSTRACT

A cup holder assembly includes a stationary upper ring, a lower cup vertically movable relative to the stationary upper ring between a first position and a second position, a flexible sleeve extending between an upper edge of the lower cup and a bottom edge of the stationary upper ring, and an actuator adapted to selectively move the lower cup relative to the stationary upper ring between the first and second positions, thereby simultaneously varying a depth of the cup holder assembly and varying an inner diameter of the cup holder assembly.

20 Claims, 2 Drawing Sheets

CUP HOLDER ASSEMBLY

INTRODUCTION

The present disclosure relates to a cup holder assembly. Cup holder assemblies are often used in vehicles to allow occupants to bring cups or bottles of liquid beverages with them. Because vehicles, particularly automobiles, are prone to vibrations, bumps and jostling, cup holders must be designed to securely hold containers of various sizes. Thus, while current cup holder assemblies achieve their intended purpose, there is a need for a new and improved cup holder assembly that has the capability to adjust the depth of the cup holder and the inner diameter of the cup holder to securely accommodate beverage containers of varying size.

SUMMARY

According to several aspects of the present disclosure, a cup holder assembly includes a stationary upper ring, a lower cup vertically movable relative to the stationary upper ring between a first position and a second position, a flexible sleeve extending between an upper edge of the lower cup and a bottom edge of the stationary upper ring, and an actuator adapted to selectively move the lower cup relative to the stationary upper ring between the first and second positions, thereby simultaneously varying a depth of the cup holder assembly and varying an inner diameter of the cup holder assembly.

According to another aspect, the actuator includes a gear mechanism, the gear mechanism interconnecting the actuator and the lower cup and adapted to move the lower cup relative to the stationary upper ring when the actuator is rotated, wherein rotation of the actuator in a first direction moves the lower cup away from the first position upward toward the stationary upper ring and rotation of the actuator in a second direction moves the lower cup away from the second position downward away from the stationary upper ring.

According to another aspect, the flexible sleeve is adapted to deflect inward when the lower cup is moved upward toward the stationary upper ring.

According to another aspect, the flexible sleeve is made from a flexible compressible material.

According to another aspect, the flexible sleeve is made from silicone.

According to another aspect, the flexible sleeve is a one-piece cylindrical ring extending between an upper edge of the lower cup and a bottom edge of the stationary upper ring.

According to another aspect, the flexible sleeve includes a plurality of slots formed therein and spaced circumferentially around the flexible sleeve.

According to another aspect, the flexible sleeve includes a plurality of segments extending between an upper edge of the lower cup and a bottom edge of the stationary upper ring, the plurality of segments spaced circumferentially around the cup holder assembly.

According to another aspect, the lower cup is biased away from the stationary upper ring.

According to another aspect, the cup holder assembly further includes a spring positioned between the actuator and the lower cup, the spring adapted to bias the lower cup away from the stationary upper ring.

According to another aspect, the actuator includes a rotatable body, an engagement feature adapted to allow the actuator to be selectively rotated, and a first support lip extending radially inward from and circumferentially around the rotatable body, the lower cup including a second support lip extending radially outward from and circumferentially around the lower cup, further wherein, the spring is positioned between the first and second support lips to bias the lower cup away from the stationary ring.

According to another aspect, the rotatable body of the actuator and the lower cup have one of a cylindrical and frustoconical shape.

According to another aspect, the gear mechanism includes a ramp formed within the rotatable body of the actuator, the lower cup including a pin extending radially outward from the second support lip and engaging the ramp, further wherein, when the actuator and the ramp is rotated in the first direction the pin follows the ramp upward and moves the lower cup away from the first position upward toward the stationary upper ring and when the actuator and the ramp is rotated in the second direction the pin follows the ramp downward and moves the lower cup away from the second position downward away from the stationary upper ring.

According to another aspect, the ramp includes detents formed therein, the biasing force of the spring adapted to maintain the pin within the detents absent selective rotation of the actuator to secure the position of the lower cup relative to the stationary upper ring.

According to another aspect, the gear mechanism includes a threaded engagement between the actuator and the lower cup.

According to several aspects of the present disclosure, a cup holder assembly includes a stationary upper ring, a lower cup vertically movable relative to the stationary upper ring between a first position and a second position, the lower cup including a second support lip extending radially outward from and circumferentially around the lower cup, a flexible sleeve extending between an upper edge of the lower cup and a bottom edge of the stationary upper ring, an actuator, the actuator including a rotatable body, an engagement feature adapted to allow the actuator to be selectively rotated, a first support lip extending radially inward from and circumferentially around the rotatable body, and a gear mechanism, the gear mechanism interconnecting the actuator and the lower cup and adapted to move the lower cup relative to the stationary upper ring when the actuator is rotated to vary a depth of the cup holder assembly, the flexible sleeve adapted to deflect inward when the lower cup is moved upward toward the stationary upper ring, and a spring positioned between the first and second support lips to bias the lower cup away from the stationary upper ring, wherein rotation of the actuator in a first direction moves the lower cup away from the first position upward toward the stationary upper ring reducing the depth of the cup holder assembly and causing the flexible sleeve to deflect inward, reducing the inner diameter of the cup holder assembly, and rotation of the actuator in a second direction moves the lower cup away from the second position downward away from the stationary upper ring, increasing the depth of the cup holder assembly and causing the flexible sleeve to deflect less, increasing the inner diameter of the cup holder assembly.

According to another aspect, the flexible sleeve is one of a one-piece cylindrical ring extending between an upper edge of the lower cup and a bottom edge of the stationary upper ring, a one-piece cylindrical ring extending between an upper edge of the lower cup and a bottom edge of the stationary upper ring including a plurality of slots formed therein and spaced circumferentially around the flexible sleeve, and a plurality of segments extending between an upper edge of the lower cup and a bottom edge of the stationary upper ring, the plurality of segments spaced circumferentially around the cup holder assembly.

According to another aspect, the rotatable body of the actuator and the lower cup have one of a cylindrical and frustoconical shape.

According to another aspect, the gear mechanism includes a ramp formed within the rotatable body of the actuator, the lower cup including a pin extending radially outward from the second support lip and engaging the ramp, further wherein, when the actuator and the ramp is rotated in the first direction the pin follows the ramp upward and moves the lower cup away from the first position upward toward the stationary upper ring and when the actuator and the ramp is rotated in the second direction the pin follows the ramp downward and moves the lower cup away from the second position downward away from the stationary upper ring, the ramp further including detents formed therein, the biasing force of the spring adapted to maintain the pin within the detents absent selective rotation of the actuator to secure the position of the lower cup relative to the stationary upper ring.

According to another aspect, the gear mechanism comprises a threaded engagement between the actuator and the lower cup.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
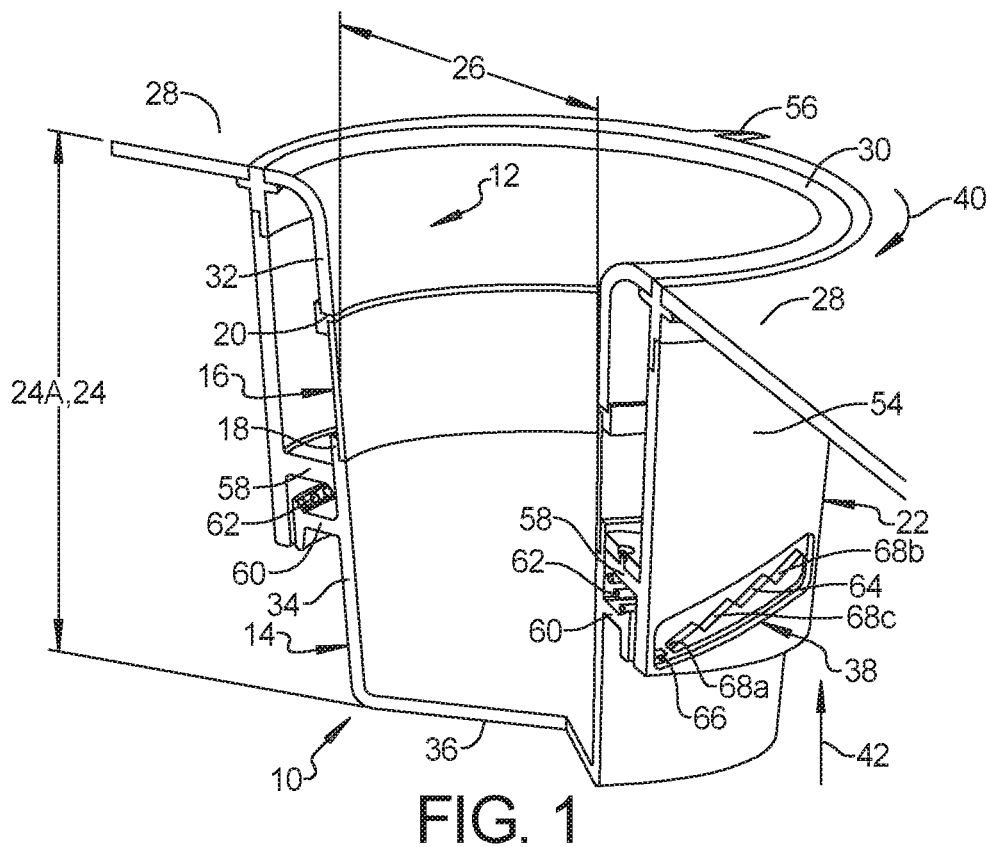
FIG. 1 is a sectional view of a cup holder assembly in accordance with an exemplary embodiment, wherein the lower cup is in a first position.

Referring to FIG. 1, a cup holder assembly 10 according to aspects of the present disclosure includes a stationary upper ring 12, a lower cup 14 vertically movable relative to the stationary upper ring 12 between a first position and a second position, a flexible sleeve 16 extending between an upper edge 18 of the lower cup 14 and a bottom edge 20 of the stationary upper ring 12, and an actuator 22 adapted to selectively move the lower cup 14 relative to the stationary upper ring 12 between the first and second positions to simultaneously vary a depth 24 of the cup holder assembly 10 and an inner diameter 26 of the cup holder assembly 10.

The stationary upper ring 12 is supported on a surface 28, such as the instrument panel or center console within an automobile. The stationary upper ring 12 is not vertically moveable. The stationary upper ring 12 is also not rotatable. The stationary upper ring 12 defines the opening wherein a beverage container, such as a cup of coffee or bottle of water will be supported by the cup holder assembly 10. The stationary upper ring 12 includes a top edge 30 that is substantially flush with the surface 28 wherein the cup holder assembly 10 is mounted. The top edge 30 is beveled to aid in the insertion of items into the cup holder assembly 10. The stationary upper ring 12 further includes a generally cylindrical body 32 extending downward from the top edge 30. The body 32 of the stationary upper ring 12 may be perfectly cylindrical, or may have a frustoconical shape, that gets narrower extending downward into the cup holder assembly 10, as shown in the Figures.

Figure 2:
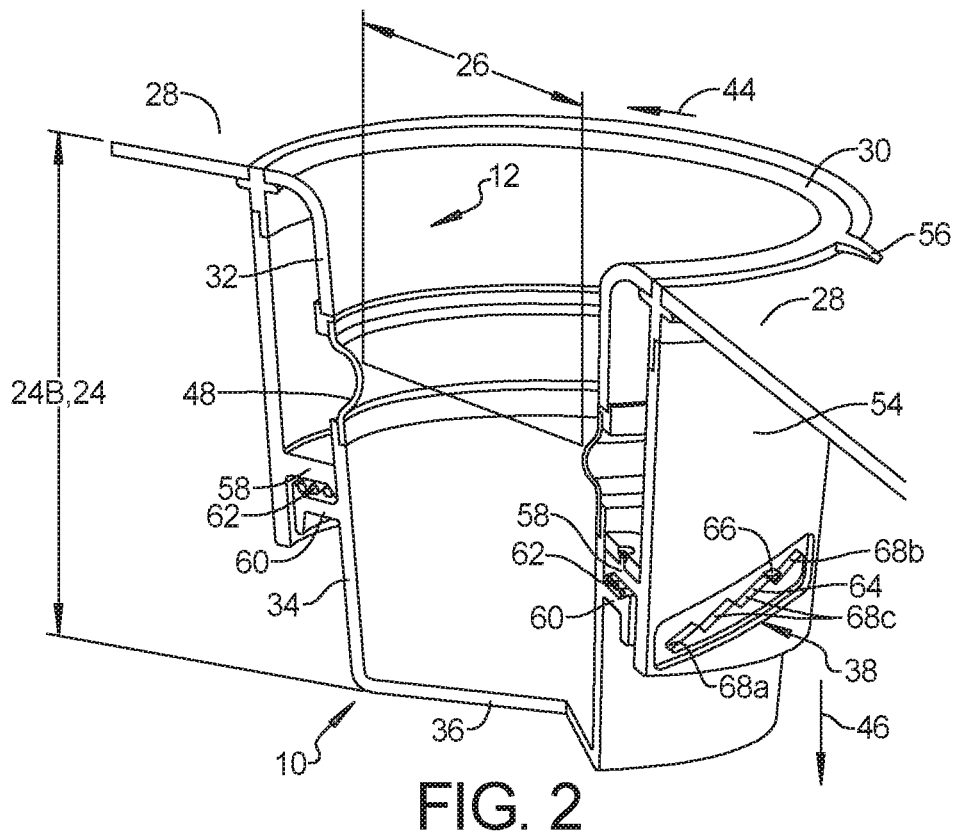
FIG. 2 is a sectional view of the cup holder assembly shown in FIG. 1, wherein the lower cup is in a second position.

The lower cup 14 is substantially cup shaped and has a generally cylindrical lower cup body 34 extending upward from a bottom section 36. The lower cup body 34 may be perfectly cylindrical, or may have a frustoconical shape, that gets narrower extending downward, wherein the bottom section 36 is formed at the narrow end, distally opposite the upper edge 18 of the lower cup 14. The lower cup 14 is vertically movable relative to the stationary upper ring 12 between a first position and a second position. Referring to FIG. 1, in the first position, the lower cup 14 is positioned down away from the stationary upper ring 12. Referring to FIG. 2, in the second position, the lower cup 14 is raised relative to the stationary upper ring 12 and is positioned closer to the stationary upper ring 12. The depth 24A of the cup holder assembly 10 when the lower cup 14 is in the first position is larger than the depth 24B of the cup holder assembly 10 when the lower cup 14 is in the second position.

The flexible sleeve 16 extends between the upper edge 18 of the lower cup 14 and the bottom edge 20 of the stationary upper ring 12. The stationary upper ring 12, the flexible sleeve 16, and the lower cup 14 define a space adapted to receive and support a beverage container therein.

The actuator 22 is adapted to selectively move the lower cup 14 relative to the stationary upper ring 12. The actuator 22 moves the lower cup 14 between the first and second positions. Movement of the lower cup 14 relative to the stationary upper ring 12 changes the depth 24 of the cup holder assembly 10. Simultaneously, movement of the lower cup 14 relative to the stationary upper ring 12 changes the distortion of the flexible sleeve 16 extending between the stationary upper ring 12 and the lower cup 14. Referring to FIG. 1, when the lower cup 14 is in the first position, the flexible sleeve 16 is extended substantially straight between the stationary upper ring 12 and the lower cup 14. Movement of the lower cup 14 upward away from the first position compresses the flexible sleeve 16 between the stationary upper ring 12 and the lower cup 14, causing the flexible sleeve 16 to deflect inward, as shown in FIG. 2.

When the flexible sleeve 16 deflects inward, the inner diameter 26 of the cup holder assembly is reduced. Thus, the cup holder assembly 10 is adaptable to hold a larger sized cup or beverage container when the lower cup 14 is in the first position. Movement of the lower cup 14 away from the first position, upward toward the stationary upper ring 12 both reduces the depth 24 of the cup holder assembly and reduces the inner diameter 26 of the cup holder assembly 10, adapting the cup holder assembly 10 for a smaller cup or beverage container.

The actuator 22 includes a gear mechanism 38. The gear mechanism 38 interconnects the actuator 22 and the lower cup 14 and moves the lower cup 14 relative to the stationary upper ring 12 when the actuator 22 is rotated. Rotation of the actuator 22 in a first direction, or clockwise, as indicated by arrow 40 in FIG. 1, moves the lower cup 14 away from the first position upward toward the stationary upper ring 12, as indicated by arrow 42. Rotation of the actuator 22 in a second direction, or counterclockwise, as indicated by arrow 44 in FIG. 2, moves the lower cup 14 away from the second position downward away from the stationary upper ring 12, as indicated by arrow 46.

The flexible sleeve 16 is adapted to deflect inward when the lower cup 14 is moved upward toward the stationary upper ring 12. The material that the flexible sleeve 16 is made from is sufficiently flexible and compressible to allow the flexible sleeve 16 to deform and deflect inward when compressed between the stationary upper ring 12 and the lower cup 14. In one exemplary embodiment the flexible sleeve 16 is made from silicone, which provides adequate flexibility to allow the flexible sleeve 16 to deform. In addition, silicone provides a surface that has gripping characteristics to aid in securely holding a cup or beverage container. This is particularly useful in automotive applications, where the cup holder assembly 10 must securely hold a cup or beverage container while the automobile is moving.

Referring to FIGS. 1 and 2, in an exemplary embodiment, the flexible sleeve 16 is a one-piece cylindrical ring extending between the upper edge 18 of the lower cup 14 and the bottom edge 20 of the stationary upper ring 12. To ensure that the flexible sleeve 16 can deflect inward, a middle portion 48 of the flexible sleeve 16 may be thinner. As the flexible sleeve 16 deflects inward, the inner diameter 26 will get smaller, compressing the flexible sleeve 16 circumferentially. Making the middle portion 48 of the flexible sleeve 16 thinner will allow this middle portion 48 of the flexible sleeve 16 to compress to accommodate the reduction of the inner diameter 26.

Figure 3:
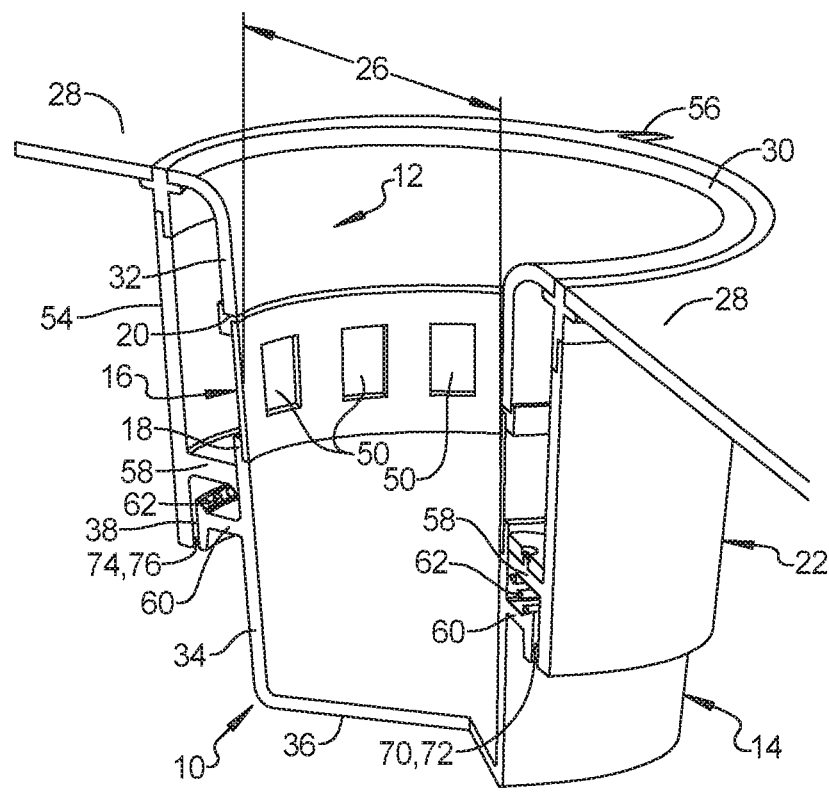
FIG. 3 is a sectional view of a cup holder assembly in accordance with an exemplary embodiment, wherein the flexible sleeve includes a plurality of slots formed therein and there is a threaded engagement between the actuator and the lower cup.
Figure 4:
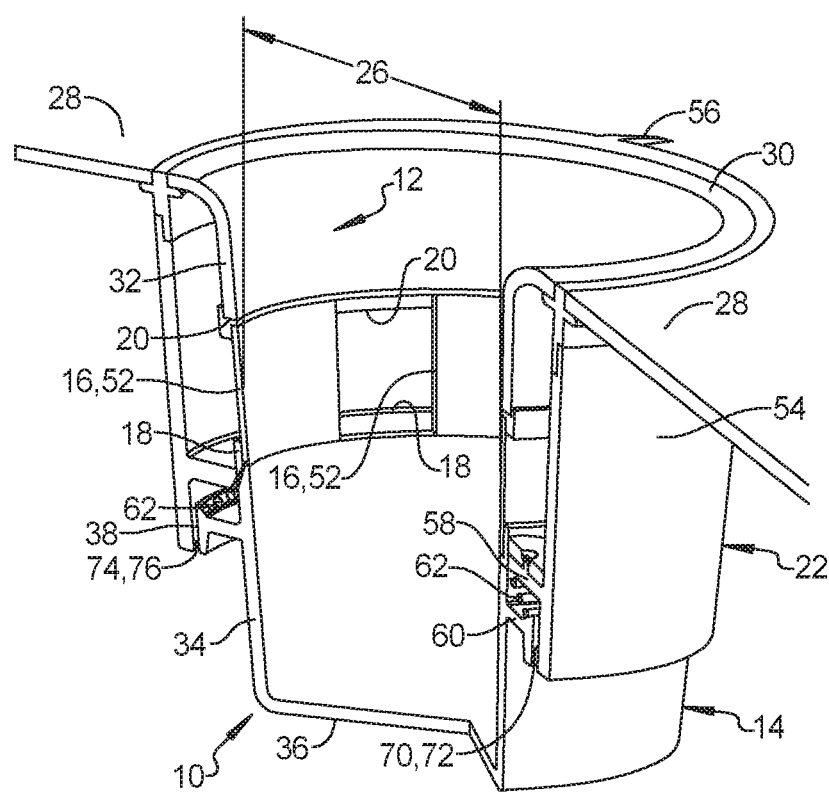
FIG. 4 is a sectional view of a cup holder assembly in accordance with an exemplary embodiment, wherein the flexible sleeve includes a plurality of segments.

Referring to FIG. 3, in another exemplary embodiment, the flexible sleeve 16 includes a plurality of slots 50 formed therein and spaced circumferentially around the flexible sleeve 16. The slots 50 will provide gaps in the flexible sleeve 16 that will allow the flexible sleeve 16 to deflect inward to a reduced inner diameter 26. Referring to FIG. 4, in another exemplary embodiment, the flexible sleeve 16 comprises a plurality of segments 52 extending between an upper edge 18 of the lower cup 14 and a bottom edge 20 of the stationary upper ring 12. The segments 52 are spaced circumferentially around the cup holder assembly 10. As described above, having spaced segments 52 provides gaps that allow deflection of the flexible sleeve 16 inward when the flexible sleeve 16 is compressed between the stationary upper ring 12 and the lower cup 14.

Referring again to FIGS. 1 and 2, in an exemplary embodiment, the actuator 22 includes a rotatable body 54, an engagement feature 56 adapted to allow the actuator 22 to be selectively rotated, and a first support lip 58 extending radially inward from and circumferentially around the rotatable body 54. The rotatable body 54 of the actuator 22 has a generally cylindrical shape corresponding to the shape of the stationary upper ring 12 and the lower cup 14. The rotatable body 54 of the actuator 22 may be perfectly cylindrical, or may have a frustoconical shape, that gets narrower extending downward into the cup holder assembly 10, as shown in the Figures.

The lower cup 14 includes a second support lip 60 extending radially outward from and circumferentially around the lower cup 14. The lower cup 14 is biased downward away from the stationary upper ring 12. In an exemplary embodiment, a spring 62 is positioned between the first and second support lips 58, 60 to bias the lower cup 14 away from the stationary upper ring 12.

Referring to FIGS. 1 and 2, in an exemplary embodiment, the gear mechanism 38 includes a ramp 64 formed within the rotatable body 54 of the actuator 22. The lower cup 14 includes a pin 66 extending radially outward from the second support lip 60 and engaging the ramp 64. When the actuator 22 is rotated in the first direction, clockwise, as indicated by arrow 40 in FIG. 1, the pin 66 follows the ramp 64 upward and moves the lower cup 14 away from the first position upward toward the stationary upper ring 12, as indicated by arrow 42. When the actuator 22 is rotated in the second direction, counter-clockwise, as indicated by arrow 44 in FIG. 2, the pin 66 follows the ramp 64 downward and moves the lower cup 14 away from the second position downward away from the stationary upper ring 12, as indicated by arrow 46.

In the exemplary embodiment shown in FIGS. 1 and 2, the ramp 64 includes detents 68 formed therein. When the pin 66 is positioned within one of the detents 68, the biasing force of the spring 62 will keep the pin 66 within the detent 68. When sufficient force is selectively applied to the actuator 22 to overcome the biasing force of the spring 62, the actuator 22 will rotate. The pin 66 will be positioned within a first detent 68A when the lower cup 14 is in the first position, and the pin 66 will be positioned within a second detent 68B when the lower cup 14 is in the second position. In the exemplary embodiment shown in FIGS. 1 and 2, there are two intermediate detents 68C that will secure the lower cup 14 at an intermediate position between the first and second positions.

Referring again to FIG. 3, in another exemplary embodiment, the gear mechanism 38 comprises a threaded engagement between the actuator 22 and the lower cup 14. As shown in FIG. 3, an outer surface 70 of the second support lip 60 on the lower cup 14 includes outwardly facing threaded surface 72 and an inner surface 74 of the rotatable body 54 of the actuator 22 includes a corresponding inwardly facing threaded surface 76 engaged with the outwardly facing threaded surface 72 of the lower cup 14. Rotation of the actuator 22 will cause the lower cup 14 to thread upward or downward relative to the stationary upper ring 12, depending on the direction of rotation.

A cup holder assembly 10 of the present disclosure offers several advantages. These include the ability to selectively adjust the depth and inner diameter of the cup holder assembly to accommodate beverage containers of varying size and securely hold them within the cup holder assembly.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cup holder assembly, comprising:
   a stationary upper ring;
   a lower cup vertically movable relative to the stationary upper ring between a first position and a second position;
   a flexible sleeve extending between an upper edge of the lower cup and a bottom edge of the stationary upper ring; and
   an actuator adapted to selectively move the lower cup relative to the stationary upper ring between the first and second positions, thereby simultaneously varying a depth of the cup holder assembly and varying an inner diameter of the cup holder assembly.

2. The cup holder assembly of claim 1, wherein the actuator includes a gear mechanism, the gear mechanism interconnecting the actuator and the lower cup and adapted to move the lower cup relative to the stationary upper ring when the actuator is rotated, wherein rotation of the actuator in a first direction moves the lower cup away from the first position upward toward the stationary upper ring and rotation of the actuator in a second direction moves the lower cup away from the second position downward away from the stationary upper ring.

3. The cup holder assembly of claim 2, wherein the flexible sleeve is adapted to deflect inward when the lower cup is moved upward toward the stationary upper ring.

4. The cup holder assembly of claim 3, wherein the flexible sleeve is made from a flexible compressible material.

5. The cup holder assembly of claim 4, wherein the flexible sleeve is made from silicone.

6. The cup holder assembly of claim 3, wherein the flexible sleeve is a one-piece cylindrical ring extending between an upper edge of the lower cup and a bottom edge of the stationary upper ring.

7. The cup holder assembly of claim 6, wherein the flexible sleeve includes a plurality of slots formed therein and spaced circumferentially around the flexible sleeve.

8. The cup holder assembly of claim 3, wherein the flexible sleeve includes a plurality of segments extending between an upper edge of the lower cup and a bottom edge of the stationary upper ring, the plurality of segments spaced circumferentially around the cup holder assembly.

9. The cup holder assembly of claim 2, wherein the lower cup is biased away from the stationary upper ring.

10. The cup holder assembly of claim 9, further including a spring positioned between the actuator and the lower cup, the spring adapted to bias the lower cup away from the stationary upper ring.

11. The cup holder assembly of claim 10, wherein the actuator includes a rotatable body, an engagement feature adapted to allow the actuator to be selectively rotated, and a first support lip extending radially inward from and circumferentially around the rotatable body, the lower cup including a second support lip extending radially outward from and circumferentially around the lower cup, further wherein, the spring is positioned between the first and second support lips to bias the lower cup away from the stationary ring.

12. The cup holder assembly of claim 11, wherein the rotatable body of the actuator and the lower cup have one of a cylindrical and frustoconical shape.

13. The cup holder assembly of claim 11, wherein the gear mechanism includes a ramp formed within the rotatable body of the actuator, the lower cup including a pin extending radially outward from the second support lip and engaging the ramp, further wherein, when the actuator and the ramp is rotated in the first direction the pin follows the ramp upward and moves the lower cup away from the first position upward toward the stationary upper ring and when the actuator and the ramp is rotated in the second direction the pin follows the ramp downward and moves the lower cup away from the second position downward away from the stationary upper ring.

14. The cup holder assembly of claim 13, wherein the ramp includes detents formed therein, the biasing force of the spring adapted to maintain the pin within the detents absent selective rotation of the actuator to secure the position of the lower cup relative to the stationary upper ring.

15. The cup holder assembly of claim 11, wherein the gear mechanism comprises a threaded engagement between the actuator and the lower cup.

16. A cup holder assembly, comprising:
a stationary upper ring;
a lower cup vertically movable relative to the stationary upper ring between a first position and a second position, the lower cup including a second support lip extending radially outward from and circumferentially around the lower cup;
a flexible sleeve extending between an upper edge of the lower cup and a bottom edge of the stationary upper ring;
an actuator, the actuator including a rotatable body, an engagement feature adapted to allow the actuator to be selectively rotated, a first support lip extending radially inward from and circumferentially around the rotatable body, and a gear mechanism, the gear mechanism interconnecting the actuator and the lower cup and adapted to move the lower cup relative to the stationary upper ring when the actuator is rotated to vary a depth of the cup holder assembly, the flexible sleeve adapted to deflect inward when the lower cup is moved upward toward the stationary upper ring; and
a spring positioned between the first and second support lips to bias the lower cup away from the stationary upper ring;
wherein rotation of the actuator in a first direction moves the lower cup away from the first position upward toward the stationary upper ring reducing the depth of the cup holder assembly and causing the flexible sleeve to deflect inward, reducing the inner diameter of the cup holder assembly, and rotation of the actuator in a second direction moves the lower cup away from the second position downward away from the stationary upper ring, increasing the depth of the cup holder assembly and causing the flexible sleeve to deflect less, increasing the inner diameter of the cup holder assembly.

17. The cup holder assembly of claim 16, wherein the flexible sleeve is one of a one-piece cylindrical ring extending between an upper edge of the lower cup and a bottom edge of the stationary upper ring, a one-piece cylindrical ring extending between an upper edge of the lower cup and a bottom edge of the stationary upper ring including a plurality of slots formed therein and spaced circumferentially around the flexible sleeve, and a plurality of segments extending between an upper edge of the lower cup and a bottom edge of the stationary upper ring, the plurality of segments spaced circumferentially around the cup holder assembly.

18. The cup holder assembly of claim 16, wherein the rotatable body of the actuator and the lower cup have one of a cylindrical and frustoconical shape.

19. The cup holder assembly of claim 16, wherein the gear mechanism includes a ramp formed within the rotatable body of the actuator, the lower cup including a pin extending radially outward from the second support lip and engaging the ramp, further wherein, when the actuator and the ramp is rotated in the first direction the pin follows the ramp upward and moves the lower cup away from the first position upward toward the stationary upper ring and when the actuator and the ramp is rotated in the second direction the pin follows the ramp downward and moves the lower cup away from the second position downward away from the stationary upper ring, the ramp further including detents formed therein, a biasing force of the spring adapted to maintain the pin within the detents absent selective rotation of the actuator to secure the position of the lower cup relative to the stationary upper ring.

20. The cup holder assembly of claim 16, wherein the gear mechanism comprises a threaded engagement between the actuator and the lower cup.

\* \* \* \* \*